Figure 1:
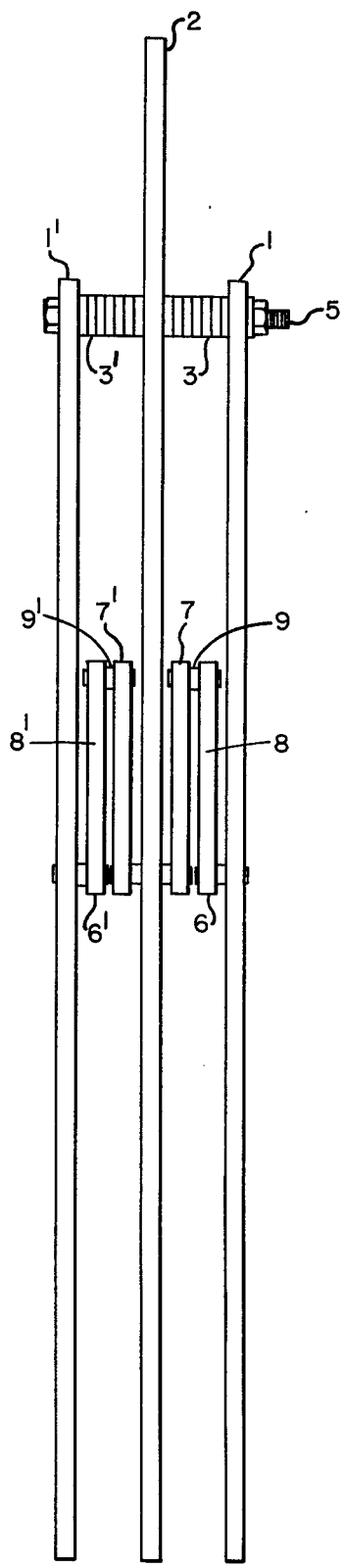

United States Patent [19]

Paull

[11] 4,267,637
[45] May 19, 1981

[54] DEVICE FOR SETTING-UP A BASEBALL DIAMOND

[76] Inventor: Sheldon A. Paull, 9248 Lavergne, Skokie, Ill. 60076

[21] Appl. No.: 51,676

[22] Filed: Jun. 25, 1979

Related U.S. Application Data

[63] Continuation-in-part of Ser. No. 847,661, Nov. 1, 1977, abandoned.

[51] Int. Cl.³ .................. G01B 5/24; G01C 15/00
[52] U.S. Cl. ..................................... 33/1 G; 33/276; 33/286; 33/455
[58] Field of Search .............. 33/1 G, 138, 174 G, 33/180, 276, 278, 280, 286, 429, 456, 465, 478, 455; 273/25

[56] References Cited

U.S. PATENT DOCUMENTS

| 431,484 | 7/1890 | Roe | 33/98 |
| 518,685 | 4/1894 | Bartley | 33/455 |
| 2,866,270 | 12/1958 | Johnson et al. | 33/455 |
| 3,668,781 | 6/1972 | Teter | 33/138 |
| 3,844,043 | 10/1974 | Gustafson | 33/455 |

Primary Examiner—Richard R. Stearns

[57] ABSTRACT

A device useful for setting up a baseball diamond which comprises a central prong and two secondary prongs, which are positioned in such a manner so as to facilitate the positioning of first, second, and third bases as well as the pitcher's rubber on a baseball diamond.

3 Claims, 2 Drawing Figures

DEVICE FOR SETTING-UP A BASEBALL DIAMOND

Introduction

This is a continuation-in-part of application Ser. No. 847,661, now abandoned, filed Nov. 1, 1977.

Baseball is the national game of the United States and is almost as equally as popular in many other countries around the world. Millions of young boys play the game every year in organized leagues of amateur teams. Many older boys and men play on industrial and semi-professional teams each year.

The game of baseball was developed from the game of cricket and an old English sport called rounders. Boston youngsters in colonial times played games called one old cat and two old cat, using one or two bases. Later they developed a game town ball that had four bases and a batter's box between home base and first base. Cricket enthusiasts in New York City developed a similar game called the New York game.

Abner Doubleday, who later became a noted army officer, laid out a diamond-shaped field with four bases 60 feet apart in 1839 at Cooperstown, N.Y., and named the game baseball. Alexander J. Cartwright, a New York surveyor, designed the game almost exactly as it is played today. He established standard rules about 1845, and laid out the diamond with most of the distances used today.

The diamond or infield is named for its shape. Most of the action is centered on this 90-foot square area. It has a base at each corner. Runners move counterclockwise around the bases, starting from home plate, or home base. Home plate is a five-sided white rubber slab. Its back corner forms a right angle that determines the two foul lines. The other bases are white canvas bags and are 15 inches square and from 3 to 5 inches thick. They are filled with kapok, a soft cottonlike material.

Play starts at the pitcher's mound, a small raised area in the center of the diamond. When he pitchers the ball, the pitcher must have one foot on a white rubber slab called the pitcher's rubber. The 24 by 6 inch rubber is 60 feet 6 inches from home plate. The catcher crouches behind the plate in the area called the catcher's box. The outfield is the area beyond the infield and between the foul lines.

The diamond used in leagues other than in professional baseball have different dimensions than those stated above. For example, the diamond used by Little League teams has bases 60 feet apart, and the pitcher's rubber is 44 feet from the plate. Other boys' leagues use diamonds ranging in size from 60 to 90 feet square.

A major problem is encountered in the setting up of a basebll diamond. Typically home plate will be placed on the ground in a park, playground for field and the other bases will be positioned by the individuals approximating the distances and angles between the bases. Typically, in nearly every instance the distances between the bases are not correct nor are the distances consistent. In addition the bases are not at the proper angle to each other. As a result of the improper placement of the bases the layout of the entire infield as well as the foul lines is incorrect.

It would be desirable to provide a simple useful device for the setting up of the baseball field, such that the bases could be laid out in such a manner that the distances between the bases is achieved. The present invention does provide a device which is useful in accomplishing this goal. The invention disclosed herein is a handy lightweight uncumbersome device which can be used on any surface or field to set up a baseball diamond in a manner of only a few minutes. In addition this invention discloses a method of setting up a baseball diamond utilizing the above-mentioned device.

OBJECTS

It is an object of this invention to provide a device for setting up a baseball diamond.

It is another object of this invention to provide a device for setting up a baseball diamond in such a manner that the distances between the bases are equal and that the alignment of the bases is in the shape of a diamond.

It is a further object of this invention to provide a device for setting up a baseball diamond which is handy, lightweight and uncumbersome and which can be used on any surface or field.

It is a still further object of this invention to provide a method of setting up a baseball diamond utilizing such a device as disclosed herein.

THE INVENTION

This invention provides a device for setting up a baseball diamond. In addition, this invention discloses a method of setting up the baseball diamond using the device disclosed herein.

The device of this invention comprises a central prong and two adjacent secondary prongs; wherein the central prong and adjacent secondary prongs are pivoted together by a means, wherein the secondary prongs are spaced equal distance on opposite sides of the central prong; and the secondary prongs are at a 90° angle to each other and each secondary prong is at a 45° angle to the central prong. The length of the prongs is not of critical importance, but typically the length of the central prong and the two secondary prongs are equal. Generally, the length of the prongs will vary from between 0.5 to 4 feet. The preferred length of the prongs is between 1 and 3 feet and the most preferred length of the prongs is between 2 and 3 fee.

The width of the prongs is generally between ¼ to 2 inches, with the preferred width being between ½ to 1 inch. The thickness is generally between 1/16 to ½ inch with the preferred thickness being between ⅛ to ¼ inch.

Oftentimes, the length, width, and thickness of the prongs may either be shorter or longer the the distances stated herein.

The composition of the prongs may consist of a wide variety of materials or substances. In order to provide a lightweight mobile device either aluminum, plastic, lightweight steel or wood is tuilized. However, materials such as brass, copper, or other metals and alloys may be used.

The central prong and the two secondary prongs are pivoted together at a central point. The preferred means for pivoting the prongs consists of a bolt which is inserted through the central prong and the secondary prongs to which a nut is fitted to the end of the bolt and tightened so that the nut will not slip off of the bolt. Any standard nut and bolt may be utilized to pivot the central prong and secondary prongs. Typically a ¼ to ½ inch nut and bolt combination is used. However, depending upon the size of the prongs and their material of construction, the size of the nut and bolt may be either larger or smaller that the sizes set forth herein.

When unfolded and being used this bolt allows a 90° angle between the secondary prongs and a 45° angle between the central prong and each secondary prong.

In order to provide for flexibility of the central prong and the secondary prongs a preferred mode of this invention involves the insertion of spacers between the central prong and each of the secondary prongs. The preferred spacers are metal coiled spacers which are between ⅛ to ½ inches in length. The preferred length of the spacers is ⅛ to ¼ inches in length.

In addition in the preferred mode of this invention, each of the secondary prongs is spaced equidistant from the central prong by means of a separate bar pivoted between each of the secondary prongs and the central prong. In a preferred embodiment, each of the bars consists of two equal sections. One of the sections is pivoted to the secondary prong and the other section is pivoted to the central prong and both of the sections are pivoted together by means of a swivel pivot. Preferably, the separate bars are pivoted to the central prong at a concurrent point. In this manner the secondary prongs may be swung open and it is ready for use in setting up the baseball diamond. Thus, the bars provide for a rigid separation between each of the secondary prongs and the central prong. When the secondary prongs are swung open, the sections of each bar form a straight line and the secondary prong is kept at a 45° angle from the central prong.

In setting up the baseball diamond both the secondary prongs are opened and the device is laid flat on the ground. Home plate is located and positioned at the bolt which hinges together the central prong and the secondary prongs. First base is then located and positioned at a given distance along the right-hand secondary prong and third base is located and positioned at a given distance in the direction of the left-hand secondary prong. Second base may then be located and positioned at a given distance in the direction of the central prong and the pitcher's rubber is located and positioned ar a given distance in the direction of the central prong. In order to help facilitate the measurement of the appropriate distances along the central prong and the secondary prongs, a graduated tape measure may be mounted at the means which pivots the central prong and the secondary prongs. The tape can then be easily used to mark off the appropriate distances. For instance, in regulation baseball, the distance from home plate to first base is 90 feet and is measured along the right-secondary prong. Similarly, the distance from home plate to third base is 90 feet and is measured along the left-hand secondary prong. Along the central prong, a distance of 60 feet 6 inches is measured for the pitcher's rubber and 127 feet 3 inches for second base, from home plate. Naturally, the dimensions will vary according to which type of ball game is going to be played. For example, in Little League, the distance from home plate to first or third base is sixty feet, forty-six feet to the pitcher's rubber and eighty-four feet ten inches to second base.

THE DRAWINGS

Figure 2:
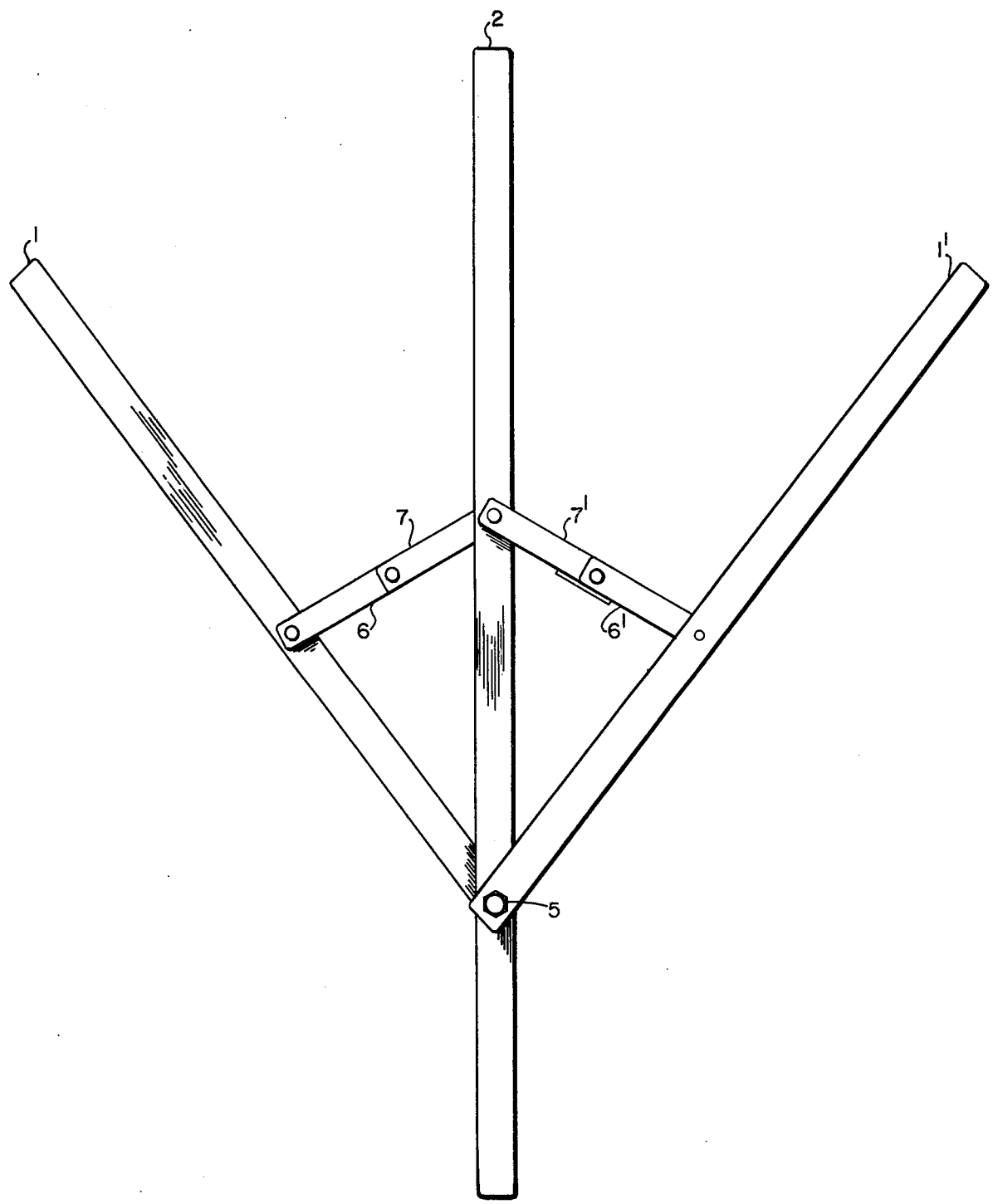

FIG. 1 is a side view of the device when it is closed and not being used; while FIG. 2 is a top view of the device when it is extended and ready for use.

FIG. 1 is the device when it is closed and consists of secondary prongs 1 and 1', a central prong 2 and a connecting bolt 5. FIG. 2 shows the device ready for use with central prong 2, secondary prongs 1 and 1' and bolt 5. FIG. 2 is the device when it is unfolded and bolt 5 can be placed at the home plate with secondary prongs 1 and 1' pointing to third and first base respectively and central prong 2 pointing to the pitcher's rubber and second base. More specfically, the preferred embodiment of the invention is shown in the drawings. FIG. 1 is a top view of the device when it is closed for easy carrying. The secondary prongs 1 and 1' are connected to the central prong 2 by means of a bolt 5. The secondary prongs 1 and 1' and the central prong 2 are separated by spacers 3 and 3'.

Each of the secondary prongs 1 and 1' are spaced equaldistant from the central prong 2 by means of a separate bar 8 and 8'. The separate bar 8 and 8' consist of two equal sections 6 and 7 and 6' and 7' respectively. Section 6 is hinged to the secondary prong 1; section 7 is hinged to the central prong 2. Section 6 and section 7 are hinged together by means of a swivel hinge 9. A similar arrangement is used for secondary prong 1', with sections 6 and 7 hinged together by means of a swivel hinge 9'.

FIG. 2 shows the device ready for use. The bolt 5 is set at home plate. The right-hand secondary prong 1' is used to locate first base. The central prong 2 is used to locate the pitcher's rubber and second base. The left-hand secondary prong 1 is used to locate third base. The bar consists of sections 6 and 7 and allows the left-hand secondary prong to form a 45° angle with the central prong. Similarly, the other bar consists of sections 6' and 7' hinged by means of a swivel hinge 9' which allows the right-hand secondary prong to form a 45° angle with the central prong and a 90° angle between the secondary prongs.

What I claim and desire to protect by Letters Patent:

1. A device for setting-up a baseball diamond comprising: a central prong and two secondary prongs; wherein said central prong and adjacent secondary prongs are pivoted together by a means; wherein said secondary prongs are spaced equidistant on opposite sides of the central prong by means of a separate bar pivoted between each secondary prong and the central prong; wherein said bar consists of two equal sections; wherein one section is pivoted to the secondary prong and the other section is pivoted to the central prong and both sections are pivoted by means of a swivel hinge; wherein said secondary prongs are at a 90° angle to each other and each secondary prong is at a 45° angle to said central prong; and wherein home plate is located at said means, first base is located at a given distance in the direction of the right-hand secondary prong, and third base is located at a given distance in the direction of the left-hand secondary prong, and second base is located at a given distance in the direction of the central prong and the pitcher's rubber is located at a given distance in the direction of the central prong.

2. The device of claim 1 wherein the separate bars are pivoted to the central prong at a concurrent point.

3. The device of claim 2 wherein each of the secondary prongs can be collapsed at the swivel hinge of said bar.

* * * * *